Feb. 21, 1961 W. A. RAY 2,972,465
MAGNET-ASSISTED DIAPHRAGM-VALVE
Original Filed Dec. 6, 1956 2 Sheets-Sheet 1

Inventor,
WILLIAM A. RAY
By John H. Rouse
Attorney

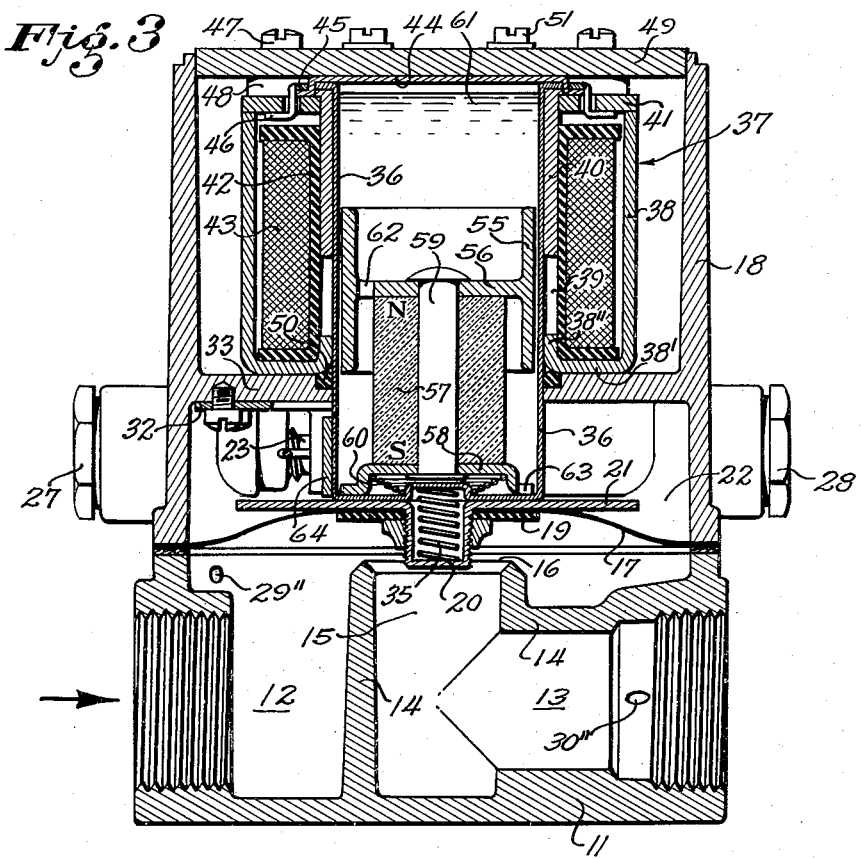

United States Patent Office 2,972,465
Patented Feb. 21, 1961

2,972,465

MAGNET-ASSISTED DIAPHRAGM-VALVE

William A. Ray, North Hollywood, Calif., assignor to General Controls Co., Glendale, Calif., a corporation of California Continuation of application Ser. No. 626,746, Dec. 6, 1956. This application May 19, 1959, Ser. No. 814,347

12 Claims. (Cl. 251—30)

This invention relates to valves of the pressure operated type wherein the flow of fluid is controlled by closure means operated by movement of a wall, such as a flexible diaphragm, continuously subjected on one side to the inlet pressure of said fluid and on its other side to fluid pressure which is varied to effect operative movements of the wall and the closure means; a general object of the invention being to provide means for applying force, preferably magnetic force, to the movable wall when the pressure on its other side is reduced, the force being applied to the wall in a sense to aid the inlet pressure on said one side thereof. Because of this provision a valve according to this invention is particularly adapted for controlling flow of fluid, such as fuel gas, when supplied at very low pressure.

This application is a continuation of my pending application, Serial No. 626,746 filed December 6, 1956, now abandoned.

This invention relates more particularly to a valve of the character described above wherein the means for varying the pressure on the other side of the movable wall comprises an auxiliary valve arranged to control flow of fluid (conveniently, the fluid controlled by the main valve) into and/or out of a pressure chamber defined in part by said other side of the wall; an object of the invention then being to provide unitary means for operating the auxiliary valve and for applying the pressure-aiding force to the movable wall.

In an arrangement of the character described in the preceding paragraph and wherein the auxiliary valve is of the magnetically operable type having a movable armature, and the movable wall includes a part of magnetic material, I accomplish my object by moving a permanent magnet into and out of good flux-linking relation to both of these movable magnetic parts.

Another object of the invention is to provide an electromagnetic operator for moving the permanent magnet, and to arrange the permanent magnet relative to the operator so that a portion of the ferromagnetic circuit of the operator forms a path for flux produced by the permanent magnet.

Further objects and advantages of the invention will become apparent from the following description and accompanying drawing, and from the appended claims.

In the drawing:

Figure 3 is a view similar to that of Figure 1 but wherein the movable parts are shown in alternate operative position.

Figure 1:
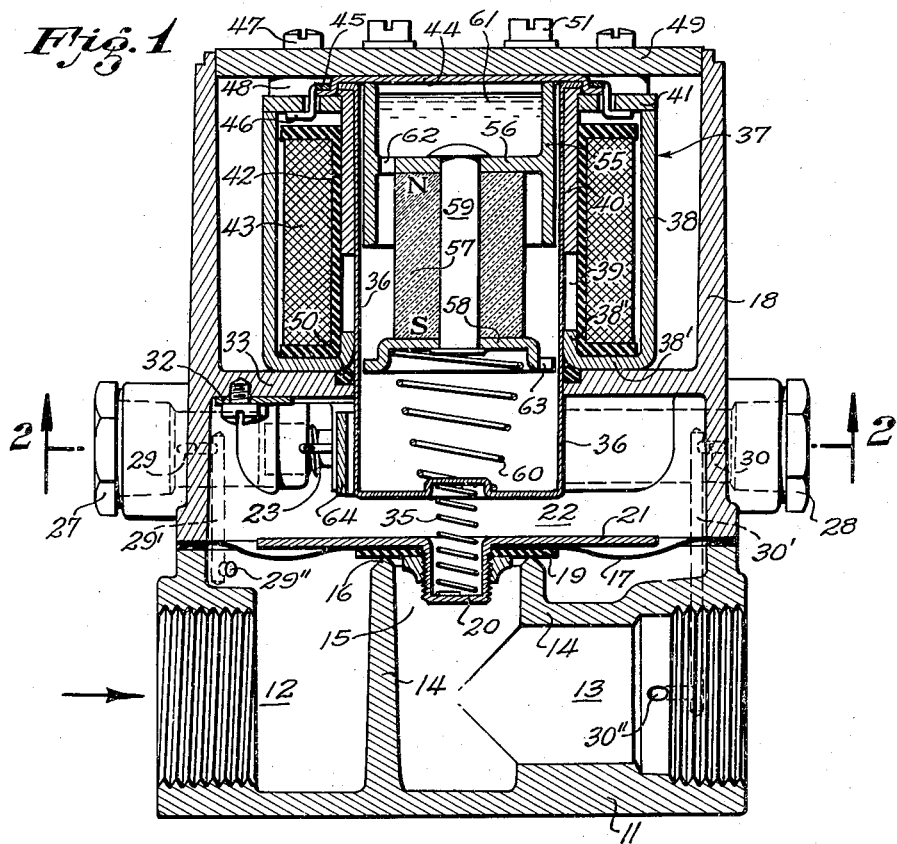
Figure 1 is a vertical sectional view of a diaphragm valve embodying this invention.

In the drawing, the numeral 11 indicates a valve casing having an inlet 12 and an outlet 13 separated by an angled partition 14 having through its horizontal portion a port 15 around whose upper end is an annular valve seat 16. Clamped to the open top of the valve casing, with the margin of a flexible diaphragm 17 therebetween, is a hollow body 18. On the underside of diaphragm 17 is a closure disc 19, cooperable with the valve seat 16, which is held in place by a nut threaded on a central depressed portion 20 of a thin plate 21 on top of the diaphragm; the plate-portion 20 projecting sealingly through openings in the diaphragm and closure disc.

In a chamber 22 inside body 18 above the diaphragm is a three-way auxiliary or pilot valve for controlling, in a usual manner, the pressure in this chamber and thereby the operative movements of the diaphragm and closure 19. As can be seen in Figure 2, this pilot valve comprises a pair of opposed jets 23 and 24 adjustably and sealingly mounted in openings 25 and 26 in thickened portions of the body 18, these openings being closed at their outer ends by screw-caps 27 and 28. The jet 23 communicates with the inlet 12 of the valve casing by way of a horizontal passage 29 seen in Figure 2 and connecting vertical and horizontal passages 29' and 29" seen in Figure 1, while the other jet 24 communicates with the outlet 13 by way of like passages 30, 30' and 30".

For controlling flow through the jets 23, 24 there is a closure arm 31 fulcrumed intermediate its ends on a bracket 32 attached to the underside of a wall 33 joining the side walls of body 18 intermediate its top and bottom, the closure arm 31 having an end portion extending between the jets and being biased into seating engagement with jet 24 by the force of a resilient wire 34 attached to the body-wall 33. With the pilot valve in the condition shown in Figure 2, the inlet jet 23 being open, diaphragm 17 is depressed (and closure 19 seated) under the force of a spring 35 compressed between the diaphragm-plate 21 and the bottom wall of a cup-shaped tubular member 36 (mounted in an opening through the body-wall 33, and to be more fully described hereinafter) since the fluid pressure is then the same on both sides of the diaphragm. Assuming that the main inlet 12 is connected to a source of pressure fluid, such as fuel gas, when the closure arm 31 is rocked (by means to be described) to its alternate position in engagement with jet 23, the fluid in chamber 22 can escape to the main outlet 13 through the open jet 24 so that the pressure of the fluid below the diaphragm tends to raise the same and unseat closure 19.

Inside the upper part of body 18, and supported by wall 33, is an electromagnet of the solenoid type generally indicated at 37 and comprising an annular magnetic frame consisting of an outer shell 38 whose lower end is formed to provide a horizontal wall 38' flanged at its center to form a tubular upward extension 38". Aligned with the tubular part 38", and spaced therefrom to provide a magnetic air-gap 39, is a tube 40 having at its top a narrow flange resting on the inner margin of a washer 41 on top of shell 38 and completing the magnetic frame. Inside this frame, and wound on a bobbin 42, is the coil 43 of the electromagnet.

The tubular member 36, which is of thin nonmagnetic material, fits snugly inside tubes 38" and 40 and has at its top a narrow flange overlying the top edge of tube 40. On top of this flange, and soldered thereto, is a cap 44 having a flange abutting washer 41 and backed by a ring 45 having fingers 46 which project through openings in washer 41 and are bent-out under the washer to hold all these parts together. Covering the open top of body 18, and held in place by screws 47 threaded in openings in bosses 48 on the inner surface of the body, is a plate 49 which bears against the cap 44 and thereby holds the electromagnet clamped to the body-wall 33; an O-ring 50, compressed by the electromagnet, serving to prevent leakage of fluid upwardly around the tubular member 36. Insulatingly mounted on plate 49 are terminal screws 51 for the leads (not shown) of coil 43.

Inside the upper part of the tubular member 36 is a tubular armature or magnetic plunger 55 having a transverse median wall 56 on whose underside is a cylindrical permanent magnet 57 and, below the magnet, a disc 58 of magnetic material and shallowly cupped at its center. These parts are secured together by a rivet 59, preferably of magnetic material, to form a magnetic assembly freely reciprocable inside the tubular member and biased in upward direction by the force of a compression spring 60 below the assembly. The permanent magnet 57 is preferably of the so-called "ceramic" type molded of material such as barium-iron oxide powder. The local path for flux produced by the permanent magnet is by way of the plunger-wall 56, the lower part of the plunger, and the magnetic disc 58.

The space remaining inside the tubular member 36 is nearly filled with a viscous liquid, indicated at 61, whose main purpose here is to prevent vibration or hum of the plunger when the electromagnet is energized by alternating current, as is fully described in my copending applications Serial No. 562,443 filed January 31, 1956, and Serial No. 594,280 filed June 27, 1956, both now abandoned, and in a continuation-in-part thereof Serial No. 672,688 filed July 18, 1957. For the passage of this liquid, when the magnetic assembly is moved, openings 62 and 63 are provided in wall 56 and disc 58, respectively.

Upon passage of current through coil 43 the plunger 55 is attracted by the electromagnet so that it moves downwardly carrying with it the permanent magnet. The movement of the plunger is more or less gradual depending on the viscosity of the film of liquid between the plunger and the side walls of the tubular housing 36.

The pilot-valve closure-arm 31 is of magnetic material and its curved end-portion 64 is disposed closely adjacent the tubular housing, so that when the permanent-magnet disc 58 is alongside of the portion 64 the permanent-magnet flux then linking with that portion effects rocking of closure-arm 31 clockwise to its alternate position wherein the inlet jet 23 is closed and the vent jet 24 open, so that (as was previously described) the diaphragm 17 tends to rise due to the difference of fluid pressure on its opposite sides.

The diaphragm plate 21 is also of magnetic material and when the plunger assembly reaches its final down position with disc 58 against the bottom wall of the tubular housing, the permanent-magnet flux then linking also with plate 21 attracts this plate upward so that force is applied to the diaphragm aiding the fluid pressure on its underside, thus ensuring rise of the diaphragm and unseating of the main closure 19 even if the fluid pressure in itself is incapable of lifting the diaphragm against the weight of plate 21 and the bias of spring 35 (whose force is preferably about equal to that of the permanent-magnet flux) when the chamber 22 above the diaphragm is vented.

When the main valve is in open position, as shown in Figure 3, the flux path of the permanent magnet then includes the plunger-wall 56, the lower part of the plunger, the tubular part 38" of the electromagnet frame, the pilot-valve armature 64, diaphragm plate 21, and disc 58. While the permannet magnet is arranged so that the flow of flux produced thereby is aided by parts of the electromagnetic operator, the permanent-magnet flux does not interfere significantly with the flux produced by the electromagnet when, as is preferred, the same is energized by alternating current, since the A.C. flux is mainly confined to the annular magnetic frame 38, 40, 41, and the plunger.

Figure 2:
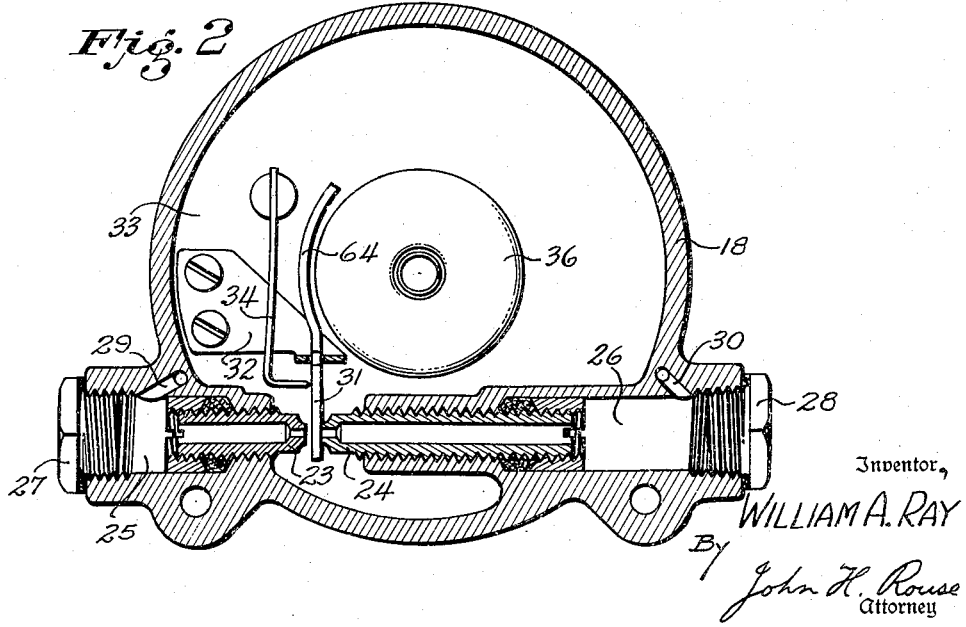
Figure 2 is a horizontal section taken along the line 2—2 of Figure 1 and viewed in an upward direction.

When the electromagnet is de-energized the plunger assembly rises under the force of spring 60 (which must be strong enough to break the attraction between the permanent magnet and the diaphragm plate) and the parts return to their normal positions shown in Figures 1–2.

Inasmuch as, according to this invention, only a small difference of fluid pressure on opposite sides of the diaphragm is needed to effect opening of the main valve, the vent jet 24 of the pilot valve can be connected (as shown) to the outlet of the valve casing despite the fact that the pressure there is normally above atmospheric. The need for an external vent-pipe leading to the atmosphere, and required by ordinary diaphragm valves, is thus avoided.

While the pilot valve controlling the pressure in chamber 22 is shown to be of the three-way type, there could be instead a simple open-closed pilot valve controlling flow into or out of the chamber, and a restricted opening permitting constant leakage of fluid in respective opposite directions.

The illustrated embodiment of my invention is obviously susceptible of further modification without departing from the spirit of the invention, and I intend therefore that no limitations be placed on the invention except as defined by the scope of the appended claims.

I claim:

1. In a diaphragm valve: a valve casing having a passage therethrough; a flexible diaphragm closing an opening in said casing and subjected on one side to the pressure of fluid at the inlet of said passage; closure means operated by movement of said diaphragm for controlling flow through said passage; a pressure chamber in said casing defined in part by the other side of said diaphragm and by one side of a partition of thin nonmagnetic material; a housing defined in part by the other side of said partition; means for varying the pressure in said chamber, so as to effect operative movements of said diaphragm and said closure means, comprising a magnetically operable auxiliary valve in said chamber having an operating armature disposed adjacent said partition; means of magnetic material carried by said diaphragm and also disposed adjacent said partition; a magnet in said housing; and means for moving said magnet into and out of effective flux-linking position relative to said armature and to said diaphragm-carried magnetic means; the arrangement being such that when said magnet is moved to said effective flux-linking position said auxiliary valve is operated to reduce the pressure in said chamber, and magnetic force is applied to the diaphragm in a sense to aid the inlet pressure on said one side thereof.

2. A diaphragm valve according to claim 1 wherein said magnet is a permanent magnet.

3. A diaphragm valve according to claim 2 wherein said means for moving said permanent magnet comprises an electromagnetic operator in said housing.

4. A diaphragm valve according to claim 3 wherein said electromagnetic operator has a ferromagnetic circuit arranged so that a portion thereof forms a path for flux produced by said permanent magnet.

5. A diaphragm valve according to claim 3 wherein said electromagnetic operator comprises an electromagnet having an annular magnetic frame and a plunger reciprocable therein, and said permanent magnet is connected to said plunger coaxially therewith.

6. A diaphragm valve according to claim 5 wherein said permanent magnet is arranged relative to said plunger so that the same forms a path for flux produced by the permanent magnet.

7. A diaphragm valve according to claim 5 wherein said partition has a cup-shaped portion projecting into said chamber along the axis of movement of said plunger and receiving said permanent magnet, the end wall of said cup-shaped portion being adjacent said diaphragm-carried magnetic means.

8. In a diaphragm valve: a valve casing having a passage therethrough; a flexible diaphragm closing an opening in said casing and subjected on one side to the pressure of fluid at the inlet of said passage; closure means operated by movement of said diaphragm for controlling flow through said passage; a pressure chamber in said casing defined in part by the other side of said diaphragm and by a wall in a plane generally parallel to that of the diaphragm; a cup of thin nonmagnetic material sealingly projecting into said chamber toward said diaphragm through an opening in said wall; means for varying the pressure in said chamber, so as to effect operative movements of said diaphragm and said closure means, comprising a magnetically operable auxiliary valve in said chamber having an operating armature disposed adjacent a side wall of said cup; a plate of magnetic material connected to said diaphragm and disposed in a plane adjacent that of the end wall of said cup; a permanent magnet receivable by said cup and magnetically cooperable with said armature and with said diaphragm-plate; and means mounted on said wall, outside said chamber, for moving said permanent magnet into and out of said cup; the arrangement being such that when the permanent magnet is moved into the cup the auxiliary valve is operated to reduce the pressure in the chamber and the diaphragm is urged inwardly of the chamber by the force of the permanent magnet.

9. A diaphragm valve according to claim 8 wherein said means for moving said permanent magnet comprises an electromagnetic operator.

10. A diaphragm valve according to claim 9 wherein said electromagnetic operator has a ferromagnetic circuit arranged so that a portion thereof forms a path for flux produced by said permanent magnet.

11. A diaphragm valve according to claim 9 wherein said electromagnetic operator comprises an electromagnet having an annular magnetic frame and a magnetic plunger operatively reciprocable therein, and said permanent magnet is connected to said plunger coaxially therewith.

12. A diaphragm valve according to claim 11 wherein said permanent magnet is arranged relative to said plunger so that the same forms a path for flux produced by the permanent magnet.

References Cited in the file of this patent

UNITED STATES PATENTS

| | | |
|---|---|---|
| 2,550,297 | Ray | Apr. 24, 1951 |
| 2,572,175 | McPherson | Oct. 23, 1951 |
| 2,629,401 | Miller | Feb. 24, 1953 |
| 2,635,635 | Eimmermann | Apr. 21, 1953 |
| 2,666,451 | Ray | Jan. 19, 1954 |
| 2,752,936 | Cantalupo | July 3, 1956 |
| 2,893,427 | Felgate | July 7, 1959 |